Patented Jan. 16, 1934

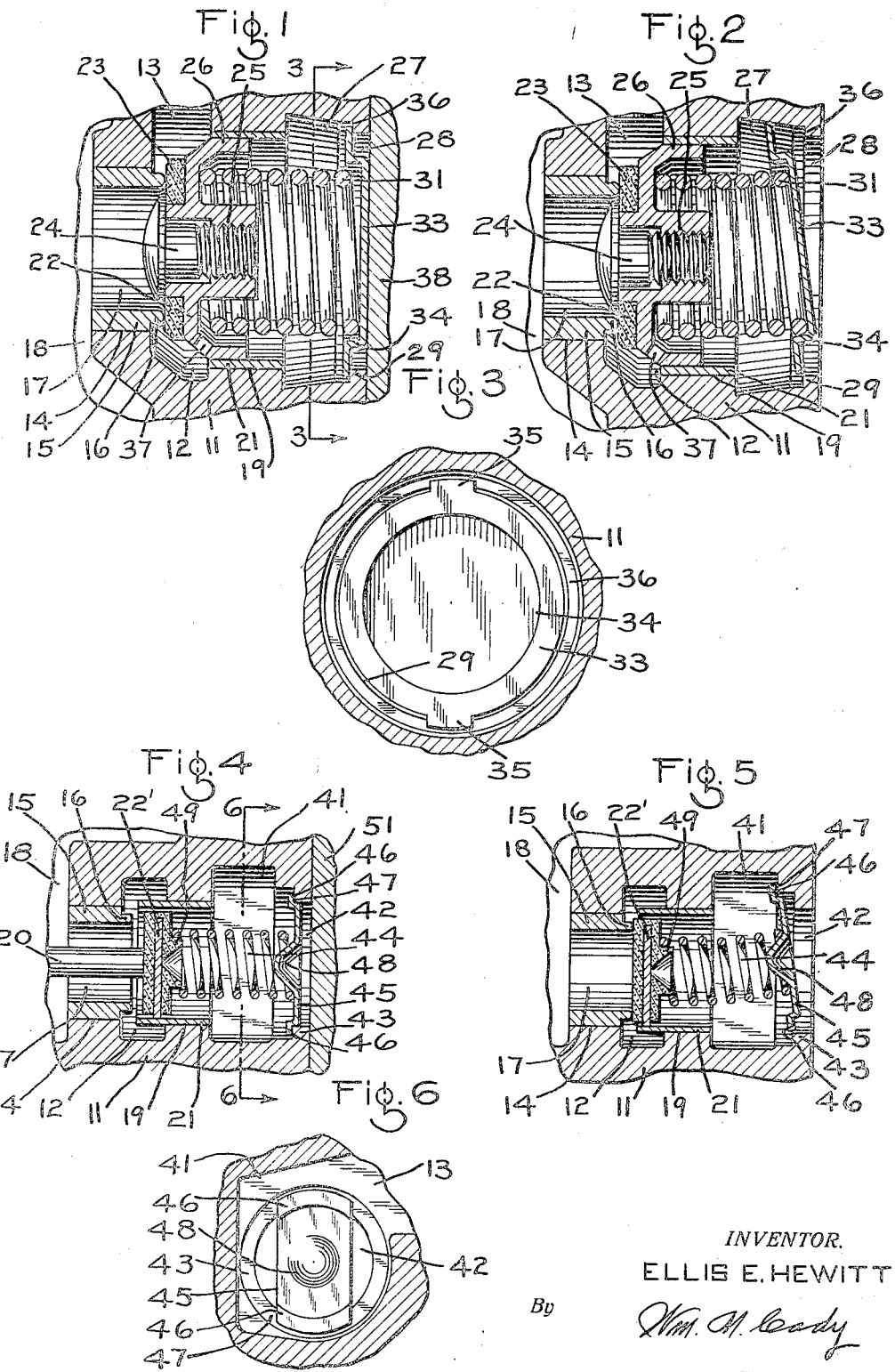

1,943,670

UNITED STATES PATENT OFFICE 1,943,670

SPRING SEAT

Ellis E. Hewitt, Edgewood, Pa., assignor to The Westinghouse Air Brake Company, Wilmerding, Pa., a corporation of Pennsylvania Application May 11, 1932. Serial No. 610,521

1 Claim. (Cl. 251—144)

This invention relates to fluid brake equipment and particularly to control and check valve devices such as are employed in fluid brake controlling valve devices.

An object of the invention is to provide a valve device wherein the valve spring is releasably retained within a valve chamber by a simple inexpensive retainer that may readily be inserted through the mouth of the chamber and moved into engagement with the valve casing for releasably retaining the spring in assembled position.

A further object of the invention is to provide a valve device and spring retainer therefor, having the above noted characteristics wherein the retainer serves to support and center the spring and is of greater length than the diameter of the mouth of the valve chamber and may be placed across the mouth after it is inserted endwise therethrough, for engaging a wall of the valve casing and for supporting said spring within the chamber.

A further object of the invention is to provide a valve device and spring retainer therefor wherein the valve and spring may be assembled within a chamber in the valve casing and releasably retained in operative assembled position, so that the valve device may be handled as a unit and the parts retained in assembled position while the unit is being attached to a support for said valve device.

These and other objects of the invention that will be made apparent throughout the further description thereof are attained by means of the apparatus hereinafter described and illustrated in the accompanying drawing; wherein Fig. 1 is a sectional view of a check valve device embodying features of my invention;

Fig. 2 is a similar view of the valve device shown in Fig. 1, showing the method of assembly of the spring retainer;

Fig. 3 is a transverse sectional view partially in elevation taken on the line 3—3 of Fig. 1 and showing the spring retainer;

Fig. 4 is a sectional view through a control valve device embodying features of my invention and showing a modified form of spring retainer;

Fig. 5 is a similar view of the device shown in Fig. 4, showing the method of assembly of the spring retainer; and Fig. 6 is a transverse sectional view of the device shown in Fig. 4, taken on the line 6—6 thereof and showing the modified form of spring retainers in elevation.

Referring to the drawing and particularly to Figs. 1, 2 and 3, the check valve structure comprises a casing 11 having a chamber 12 therein through which fluid under pressure is adapted to flow and which communicates with a passage 13. The casing is provided with a bore 14 in which a valve seat bushing 15 is pressed, the bushing being provided with an annular seat rib 16 surrounding the opening 17 in the bushing through which fluid may flow from a chamber 18 to the chamber 12.

The casing 11 is also provided with a bore 19 in which a valve guide bushing 21 is pressed and which serves to support and guide a check valve 22 that is provided with a fibre, rubber or composition seat disc 23 that is retained in position upon the valve body by a screw 24 that is threaded into a threaded opening 25 in the valve 22. The valve body is provided with a cylindrical flanged portion 26 that is slidably fitted into the bushing 21.

The chamber 12 is provided with an enlarged undercut portion 27 adjacent the mouth 28 of the chamber defined by an annular lip 29, the diameter of the mouth being less than that of the undercut portion 27 of the recess, as indicated in Figs. 1 and 2.

The valve 22 is yieldingly urged into engagement with the seat rib 16 by a spring 31 that is interposed between and engages the valve 22 and a retainer 33 that is provided with a recess 34 which serves to support and center the spring 31. The body of the retainer 33 is slightly less in diameter than the mouth 28 of the chamber 12 and is provided with two diametrically opposite extensions or lugs 35 that extend radially beyond the periphery of the retainer and which may engage the inner face 36 of the lip 29 for preventing outward movement of the retainer. The retainer is yieldingly held in retaining position shown in Fig. 1 by the tension of the spring 31. The spring, therefore, serves to hold the retainer in operative position and to yieldingly urge the valve into engagement with the seat rib 16.

When the fluid pressure within the chamber 18 exceeds that within the chamber 12 sufficiently to overcome the pressure upon the inner face of the valve 22, the valve is forced toward the right, away from the seat rib 16, and permits fluid to flow from the chamber 18 to the chamber 12 and from thence to the passage 13. The valve 22 is provided with a passage 37 through which fluid may flow in order to balance the fluid pressure on both sides of the valve.

To assemble the valve device, the seat disc 23 is first fastened to the valve 22 by means of the screw 24 and the valve is then inserted in the recess into the position shown in Fig. 1. The spring 31 is next inserted into the recess and the retainer 33 is then placed in engagement with the outer end of the spring. The retainer is next inclined or tilted with respect to the mouth of the recess so that the retainer may be moved while inclined into the recess so that the lugs 35 may pass through the mouth 28, the retainer 33 at such time being moved into the position shown in Fig. 2. After the lowermost lug 35 has cleared the lip 29 the retainer may be moved to the position shown in Fig. 1, wherein the lugs 35 engage the inner face of the lip 29 and prevent outward movement of the retainer. By reason of this construction, the spring is held in operative position by a simple retainer that may be made of pressed metal and assembled within the casing by a simple movement.

The valve device thus assembled may be handled as a unit and the parts are retained in operative position while the device is being attached to a support member 38 which serves to close the mouth of the chamber and support the valve casing. The valve casing may be secured to the support 38 by means of bolts (not shown).

Referring to Figs. 4, 5 and 6, wherein a modified form of valve device and spring retainer is shown, the valve device comprises a casing 11 having a chamber 12 through which fluid under pressure may flow and which communicates with a passage 13. The casing is provided with a bore 14 in which a valve bushing 15 is pressed, the bushing having an annular valve seat rib 16 surrounding an opening 17 in the bushing through which fluid may pass from the chamber 18 to the chamber 12.

The casing 11 is also provided with a bore 19 in which a valve guide bushing 21 is pressed. The bushing 21 serves as a guide for a valve 22' that is adapted to engage the valve seat rib 16 and close communication between the chambers 18 and 12. The valve is provided with an operating stem 20 which when moved toward the right, moves the valve 22' away from the seat rib and permits fluid to flow from the chamber 18 to chamber 12.

The chamber 12 is provided with an enlarged undercut portion 41 adjacent the mouth 42 of the chamber which is defined by an annular lip 43. A spring 44 is interposed between and engages the valve 22' and a retainer 45 that is oblong in shape. The end portions 46 of the retainer are offset as indicated in Fig. 4 and are adapted to engage the inner face 47 of the lip 43 for preventing outward movement of the retainer, which is also provided with a conical projection 48 which serves to center the spring 44 with respect to the retainer. The inner end of the spring 44 is centered upon the valve 22' by a lug 49 on the outer face of the valve 22'.

The assembly operations of the valve device shown in Fig. 4 are similar to the operations employed in assembling the valve device shown in Fig. 1. After the valve 22' is inserted within the chamber upon the seat rib 16, the spring 44 is inserted and the retainer is placed in engagement with the outer end of the spring. The retainer is then tilted so that the retainer may be moved into the recess into the position shown in Fig. 5. Since the major axis of the retainer is longer than the diameter of the mouth 42 of the chamber, the ends 46 of the retainer engage the inner face of the lip 43 when the retainer is disposed normal to the axis of the chamber and prevents outward movement of the retainer.

By reason of this construction, the valve device may be assembled as a unit and the parts retained in operative position while the valve device is being handled and connected to the supporting structure 51 which serves as a closure for the mouth 42 of the chamber. When the valve is open, fluid under pressure may flow from the chamber 18 through the opening 17 in the bushing 15, into the chamber 12 and thence past the periphery of the valve 22' to the portion of the chamber 12 on the right side of the valve to the passage 13, Fig. 6.

While I have shown but two embodiments of the invention, it is obvious that changes, omissions and additions may be made in the construction without departing from the spirit of the invention.

Having now described my invention, what I claim as new and desire to secure by Letters Patent, is:

A valve device comprising a casing having an undercut chamber through which fluid under pressure is adapted to flow and having a continuous annular retaining seat adjacent the mouth of the chamber, a valve seat in said chamber, a valve for said seat, a retainer having a major axis longer than the diameter of the mouth of the chamber and a minor axis shorter than said diameter permitting insertion of the retainer through said mouth when the retainer is tilted toward the longitudinal axis of the chamber, the said retainer having means at the ends of its major axis for engaging the retaining seat adjacent said mouth when the retainer is in a plane normal to the axis of said chamber for preventing outward movement of said retainer, and a spring interposed between and engaging said valve and said retainer for yieldingly retaining the retainer in operative position, the said retainer having means fitting into the mouth of the chamber and cooperating therewith for centering the retainer and having means cooperating with said spring for centering it with respect to the retainer.

ELLIS E. HEWITT.